Feb. 9, 1932.   A. G. BUCHAN ET AL   1,844,057
TENONING MACHINE
Filed Oct. 9, 1930     2 Sheets-Sheet 1

INVENTOR
Andrew G. Buchan
Ira J. Lyons
BY
Chappell Earl
ATTORNEYS

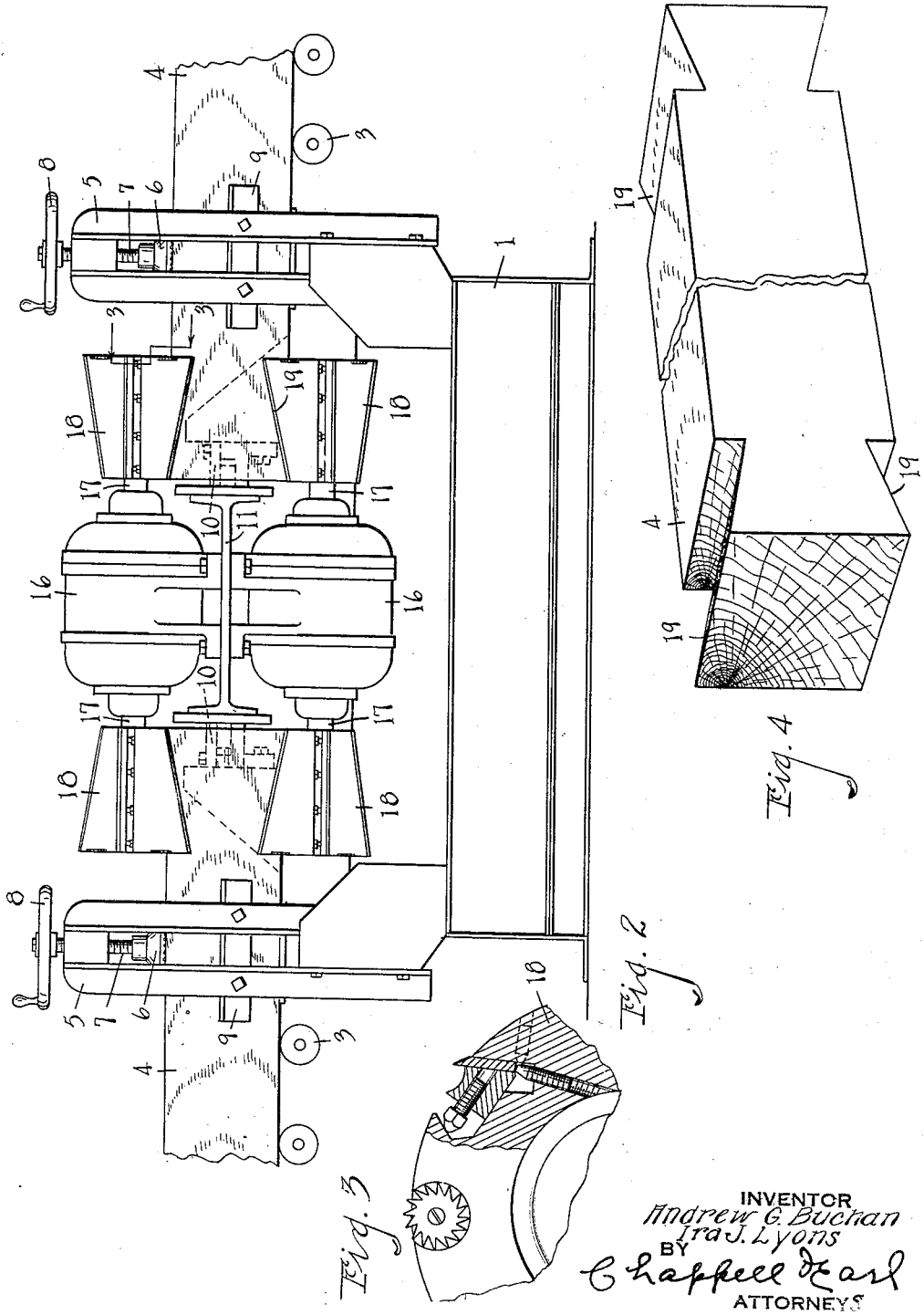

Patented Feb. 9, 1932

1,844,057

UNITED STATES PATENT OFFICE

ANDREW G. BUCHAN AND IRA J. LYONS, OF GRAND RAPIDS, MICHIGAN, ASSIGNORS TO LEITELT IRON WORKS, OF GRAND RAPIDS, MICHIGAN

TENONING MACHINE

Application filed October 9, 1930. Serial No. 487,551.

The main object of this invention is to provide a tenoning machine by means of which tenons may be quickly and accurately cut on the ends of large timbers such as are commonly employed in the building of cribs, docks and framing.

A further object is to provide a structure having these advantages by means of which such large timbers may be very easily handled to form tenons on both ends thereof.

Objects pertaining to details and economies of our invention will definitely appear from the description to follow. The invention is defined in the claims.

A structure embodying the features of our invention is clearly illustrated in the accompanying drawings, in which:

Fig. 2 is a front elevation, the conveyors being partially broken away.

Fig. 3 is an enlarged detail fragmentary view partially in section of one of the cutters, the cutter illustrated being that of the copending application of Andrew Buchan.

Fig. 4 is a fragmentary perspective view of the completed piece of work.

Figure 1:
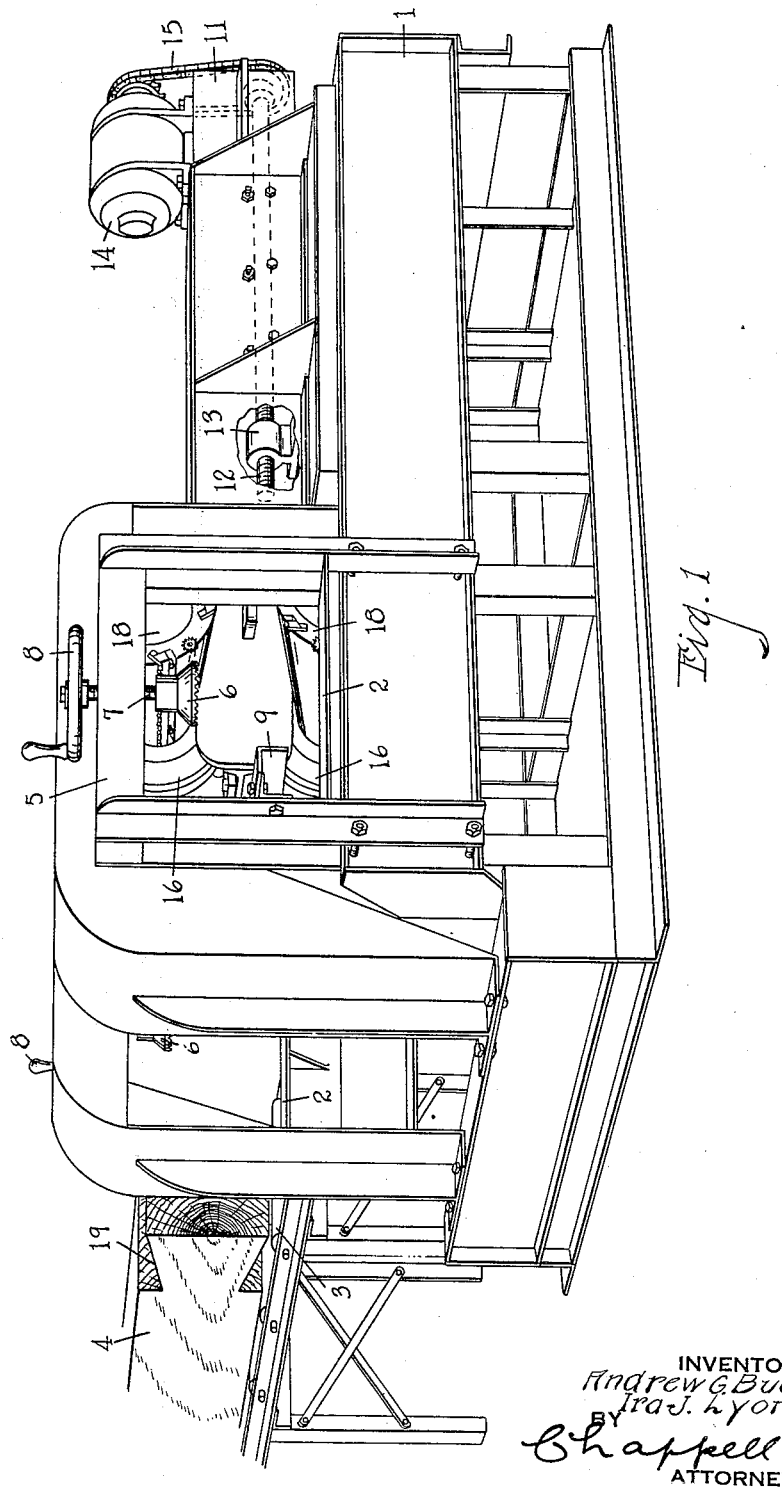
Fig. 1 is a front perspective view of our improved tenoning machine, one of the conveyors being partially broken away and the other omitted and a timber or beam having a tenon cut thereon being shown on the conveyor.

In the embodiment of our invention illustrated, the bed designated generally by the numeral 1 is of frame-like structure built up of fabricated iron and is designed to support the work and the moving parts of the machine. This bed is provided with a pair of spaced work tables 2 disposed in operative relation to the roller conveyors 3 so that the work as 4 may be advanced to the table, it being partially supported by the table and partially supported by the conveyors. The work on which the machine is designed to operate is commonly of considerable length.

The bed is provided with yokes 5 embracing the table and carrying the clamps 6 which are operated by means of the screws 7 having handwheels 8. The positioning gages 9 are mounted on the yokes to properly position the work laterally.

The bed is provided with spaced ways 10 for the carriage 11. This carriage is driven by means of the feed screw 12 coacting with a nut 13. The motor 14 is connected to the feed screw by means of the sprocket chain 15 and suitable sprockets.

On the forward end of the carriage we mount a pair of motors 16 disposed one above the other, one being mounted on the upper and the other on the lower side of the carriage. These motors are provided with driving shafts 17 which project at each end of the motor to receive the cutters 18 so that the cutters are supported in opposite pairs. The cutters are inwardly tapered so that, as the carriage is advanced to carry the cutters transversely across the work mounted in the machine as shown in Fig. 2, a dove-tailed tenon 19 is formed on the end of the work.

The machine is especially designed for cutting tenons on relatively long, heavy pieces of timber and these are advanced to the machine by one conveyor and taken away from it by the other. The work is passed through the machine after a tenon is formed on one end and its other end is then positioned to have the tenon formed thereon. After the first tenon is formed there are two pieces of work in the machine at the same time, one pair of cutters operating on the forward end of one piece as it is passed through the machine and on the rear end of the other.

Our tenoning machine in the embodiment illustrated is especially designed by us for cutting tenons on relatively large pieces of timber such as are commonly used in cribs, wharves, and heavy framing.

The machine illustrated enables the performance of a large amount of work with a minimum of manual labor and the work is very accurate. We have not attempted to illustrate other embodiments or adaptations of our improvements as we believe this disclosure will enable those skilled in the art to adapt our improvements as may be desired.

Having thus described our invention what we claim as new and desire to secure by Letters Patent:

1. In a tenoning machine, the combination of a bed, a carriage reciprocatingly mounted on said bed, a motor for driving said carriage mounted thereon, a pair of motors mounted at the front end of said carriage one above the other, said motors being provided with driving shafts disposed transversely of the path of travel of the carriage and projecting at each end of the motors, opposed pairs of inwardly tapered cutters mounted on the projecting ends of said shafts, a pair of spaced alined work tables disposed on opposite sides of the path of the carriage, work clamps operatively associated with said work tables, and conveyors associated with said work tables so that the work may be advanced to one table on one conveyor and passed through the machine from one table to the other.

2. In a tenoning machine, the combination of a bed, a carriage reciprocatingly mounted on said bed, a motor for driving said carriage mounted thereon, a pair of motors mounted at the front end of said carriage one above the other, said motors being provided with driving shafts disposed transversely of the path of travel of the carriage and projecting at each end of the motors, opposed pairs of inwardly tapered cutters mounted on the projecting ends of said shafts, and a pair of spaced alined work tables disposed on opposite sides of the path of the carriage.

3. In a tenoning machine, the combination of a bed, a carriage reciprocatingly mounted on said bed, opposed pairs of rotary cutters mounted, on said carriage, a pair of spaced alined work tables disposed on opposite sides of the path of the carriage, work clamps operatively associated with said work tables, and conveyors associated with said work tables so that the work may be advanced to one table on one conveyor and passed through the machine from one table to the other.

4. In a tenoning machine, the combination of a bed, a carriage reciprocatingly mounted on said bed, a pair of motors mounted on said carriage, one above the other, said motors being provided with driving shafts disposed transversely of the path of travel of the carriage and projecting at each end of the motors opposed pairs of rotary cutters mounted on said shafts, and work tables disposed on opposite sides of the path of the carriage.

5. In a tenoning machine, the combination of a bed, a carriage reciprocatingly mounted on said bed, a pair of motors mounted on said carriage, one above the other, said motors being provided with driving shafts disposed transversely of the path of travel of the carriage and projecting at each end of the motors opposed pairs of rotary cutters mounted on said shafts, and a pair of work holders disposed on opposite sides of the path of travel of the carriage and so that the work may be passed from one work holder to the other when the carriage is retracted.

6. In a tenoning machine, the combination of a bed, a carriage reciprocatingly mounted on said bed, a pair of motors mounted on said carriage, one above the other, said motors being provided with driving shafts disposed transversely of the path of travel of the carriage and projecting at each end of the motors opposed pairs of rotary cutters mounted on said shafts, and a pair of work holders disposed on opposite sides of the path of travel of the carriage.

7. In a tenoning machine, the combination of a bed, a pair of spaced work holders, a carriage reciprocatingly mounted on said bed to travel in a plane between said work holders, a pair of motors mounted on said carriage, one above the other, said motors being provided with driving shafts disposed transversely of the path of travel of the carriage and projecting at each end of the motors and pairs of inwardly tapered rotary cutters mounted on said shafts.

In witness whereof we have hereunto set our hands.

ANDREW G. BUCHAN.
IRA J. LYONS.